(12) United States Patent
Yang

(10) Patent No.: US 10,008,946 B1
(45) Date of Patent: Jun. 26, 2018

(54) PRIMARY-SIDE REGULATED CURRENT CONTROL SYSTEM UNDER LLC TOPOLOGY

(71) Applicant: Yu Jing Energy Technology Co., Ltd., Taoyuan (TW)

(72) Inventor: Sen-Tai Yang, Taoyuan (TW)

(73) Assignee: YU JING ENERGY TECHNOLOGY CO., LTD., Taoyuan (TW)

( * ) Notice: Subject to any disclaimer, the term of this patent is extended or adjusted under 35 U.S.C. 154(b) by 0 days. days.

(21) Appl. No.: 15/817,256

(22) Filed: Nov. 19, 2017

(51) Int. Cl.
   H05B 33/08 (2006.01)
   H02M 3/335 (2006.01)
   H02M 1/08 (2006.01)
   H02M 1/00 (2006.01)

(52) U.S. Cl.
   CPC ....... *H02M 3/33569* (2013.01); *H02M 1/083* (2013.01); *H05B 33/0815* (2013.01); *H02M 2001/0009* (2013.01); *H05B 33/0845* (2013.01)

(58) Field of Classification Search
   CPC ........... H05B 33/0815; H05B 33/0824; H02M 1/083; F21V 23/02
   See application file for complete search history.

(56) References Cited

U.S. PATENT DOCUMENTS

| | | | | |
|---|---|---|---|---|
| 2013/0271021 A1* | 10/2013 | Elferich | ............... | H02M 1/4258 315/206 |
| 2014/0375229 A1* | 12/2014 | Gruber | ................... | H02M 7/12 315/291 |
| 2016/0141951 A1* | 5/2016 | Mao | ......................... | H02M 1/36 363/21.02 |
| 2017/0110973 A1* | 4/2017 | Chen | ................. | H02M 3/33546 |

* cited by examiner

Primary Examiner — Jason M Crawford
(74) Attorney, Agent, or Firm — Pro-Techtor International Services; Ian Oglesby

(57) ABSTRACT

A primary-side regulated (PSR) current control system under a LLC topology includes a voltage polarity converting circuit, a current signal sampling circuit, a current cross-over detecting circuit, a zero current detecting circuit, and a current integrator circuit. The voltage polarity converting circuit obtains a voltage signal from the primary side of a LLC transformer and outputs a positive-voltage signal, and the current integrator circuit then obtains a current input signal outputted by the current signal sampling circuit, a zero-crossing current point outputted by the current cross-over detecting circuit, and a zero current condition outputted by the zero current detecting circuit, and raises the minimum current level of the current input signal to the zero-crossing current point based on the zero-crossing current point and the zero current condition, and generate and integrate a current integration waveform to create an output current, so the LLC transformer directly obtains, at the primary side, the output current for controlling secondary-side output load conditions.

3 Claims, 6 Drawing Sheets ions is in discontinuous conduction mode (DCM); when the operating frequency is equal to the resonant frequency, the transformer current operation is in boundary conduction mode; and when the operating frequency is higher than the resonant frequency, the transformer current operation is in continuous conduction mode (CCM). Current control methods require the additional components at the secondary side, as well as more PCB layout space and cost. In addition, the detection circuit at the secondary side creates power loss and degrades standby power consumption. Therefore, the industry has started focusing on primary-side regulation (PSR).

PRIMARY-SIDE REGULATED CURRENT CONTROL SYSTEM UNDER LLC TOPOLOGY

BACKGROUND OF THE INVENTION

1. Field of the Invention

The invention relates to a primary-side regulated (PSR) current control system under LLC topology, and more particularly, to a PSR current control system under a LLC topology that achieves stable control by obtaining a transformer current signal at the primary side and calculating an output current.

2. Description of the Prior Art

In recent years, the markets for consumer electronics and LED driver circuits continues to grow, more energy-efficient and compact power converters are also being demanded. LLC topologies has been widely used in high-efficiency voltage conversion systems, such as personal computers (PCs), server power supplies, lighting and network communication power supplies. The common LLC control is traditionally implemented with the secondary-side regulated feedback, in which a pair of an optocoupler and an error amplifier at the secondary side is used to achieve control of constant voltage and constant current. The main purpose of the secondary-side circuits is to transmit signals at the secondary side to the primary side. The feedback circuit may use these signals to adjust the duty cycle of the pulse signal to provided stable current and voltage for an output load even when the output load varies. The operating frequency of the LLC circuit is negatively correlated to the variation of the load, it may cause the transformer current to operate in three different modes: when the operating frequency is lower than the resonant frequency, the transformer current operation is in discontinuous conduction mode (DCM); when the operating frequency is equal to the resonant frequency, the transformer current operation is in boundary conduction mode; and when the operating frequency is higher than the resonant frequency, the transformer current operation is in continuous conduction mode (CCM). Current control methods require the additional components at the secondary side, as well as more PCB layout space and cost. In addition, the detection circuit at the secondary side creates power loss and degrades standby power consumption. Therefore, the industry has started focusing on primary-side regulation (PSR).

PSR controls the output load conditions and achieves constant current and constant voltage from the primary side instead of adopting a secondary-side feedback control circuit. This control method is realized by detecting a voltage signal on the auxiliary winding of the primary-side transformer in order to control the duty cycle of the pulse signal and subsequently stabilize the output load conditions.

The most common PSR-controlled architecture is flyback control. However, the flyback converter must operate in boundary conduction mode, not DCM. Once in CCM, PSR control of the flyback converter fails. The LLC topology changes output gain by changing the frequency, so the mode in which the LLC circuit is operating in cannot be restricted.

In view of the shortcomings in the prior art, the present invention is proposed to provide improvements that address these shortcomings.

SUMMARY OF THE INVENTION

One main objective of the present invention is to provide a PSR current control system under a LLC topology that achieves stable control by obtaining a transformer current signal at the primary side and calculating an output current.

In order to achieve the above objectives and efficacies, the technical means employed by the present invention may include:

a voltage polarity converting circuit electrically connected with the primary side of a default LLC transformer for converting negative voltage in a voltage signal to a positive voltage and outputting a positive-voltage signal;

a current signal sampling circuit electrically connected with the voltage polarity converting circuit for receiving the positive-voltage signal to obtain a current input signal;

a current cross-over detecting circuit electrically connected with the voltage polarity converting circuit for receiving the positive-voltage signal to calculate a zero-crossing current point;

a zero current detecting circuit electrically connected with the primary side of the LLC transformer to detect a zero current condition; and a current integrator circuit electrically connected with the current signal sampling circuit, the current cross-over detecting circuit and the zero current detecting circuit for receiving the current input signal, the zero-crossing current point and the zero current condition to raise the minimum current level of the current input signal to the zero-crossing current point based on the zero-crossing current point and the zero current condition, and generate and integrate a current integration waveform to create an output current.

As a result, the voltage polarity converting circuit obtains the voltage signal from the primary side of the LLC transformer and outputs the positive-voltage signal, and the current integrator circuit then obtains the current input signal outputted by the current signal sampling circuit, the zero-crossing current point outputted by the current cross-over detecting circuit, and the zero current condition outputted by the zero current detecting circuit, and raises the minimum current level of the current input signal to the zero-crossing current point based on the zero-crossing current point and the zero current condition, and generate and integrate a current integration waveform to create an output current, so the LLC transformer directly obtains, at the primary side, the output current for controlling secondary-side output conditions.

Based on the above structure, the current cross-over detecting circuit is electrically connected to a default zero potential node of the LLC transformer.

Based on the above structure, the current integrator circuit is electrically connected to a default LED driver circuit.

The objectives, efficacies and features of the present invention can be more fully understood by referring to the drawing as follows:

DETAILED DESCRIPTION OF THE PREFERRED EMBODIMENTS

Figure 1:
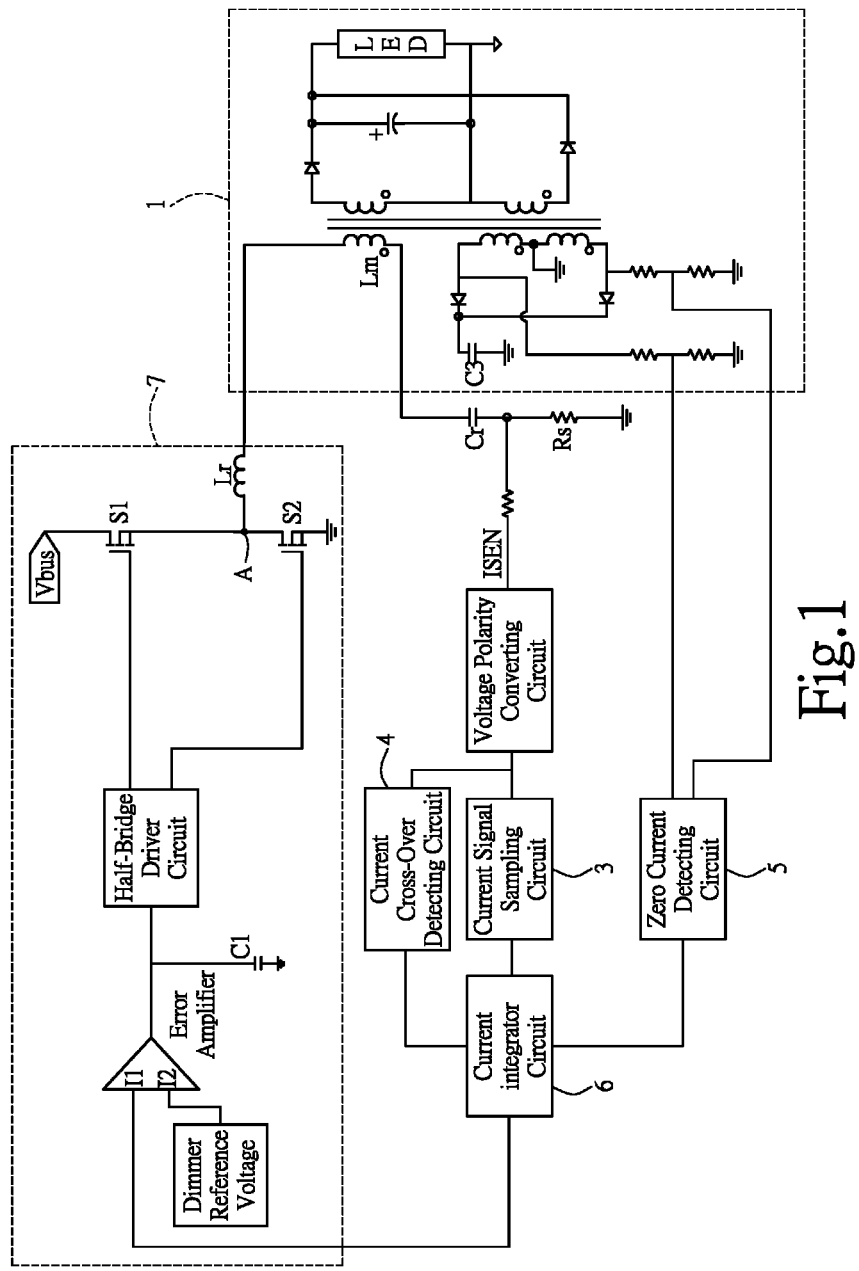
FIG. 1 is a schematic block diagram depicting the circuits of a PSR current control system under a LLC topology in accordance with a preferred embodiment of the present invention.
Figure 2:
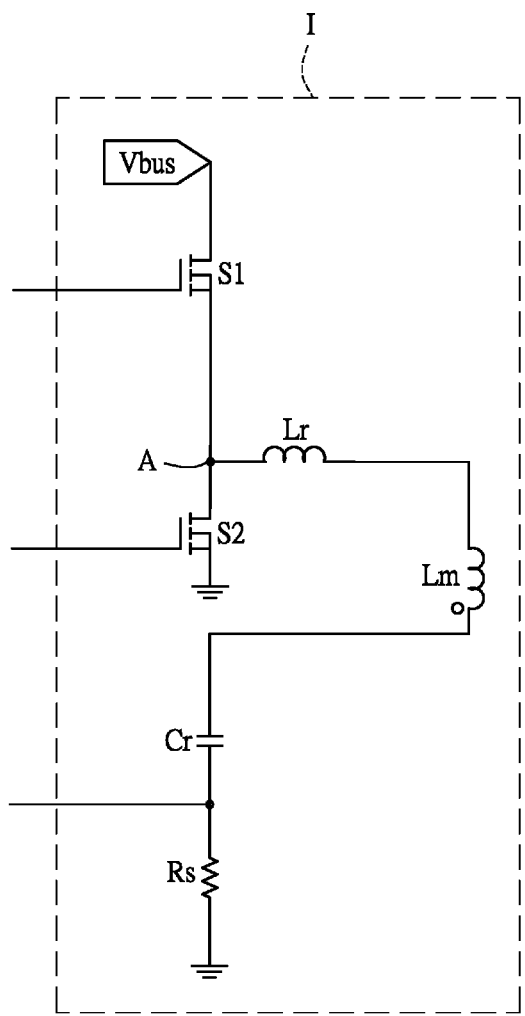
FIG. 2 is a circuit diagram depicting a portion of the circuits in FIG. 1.
Figure 3:
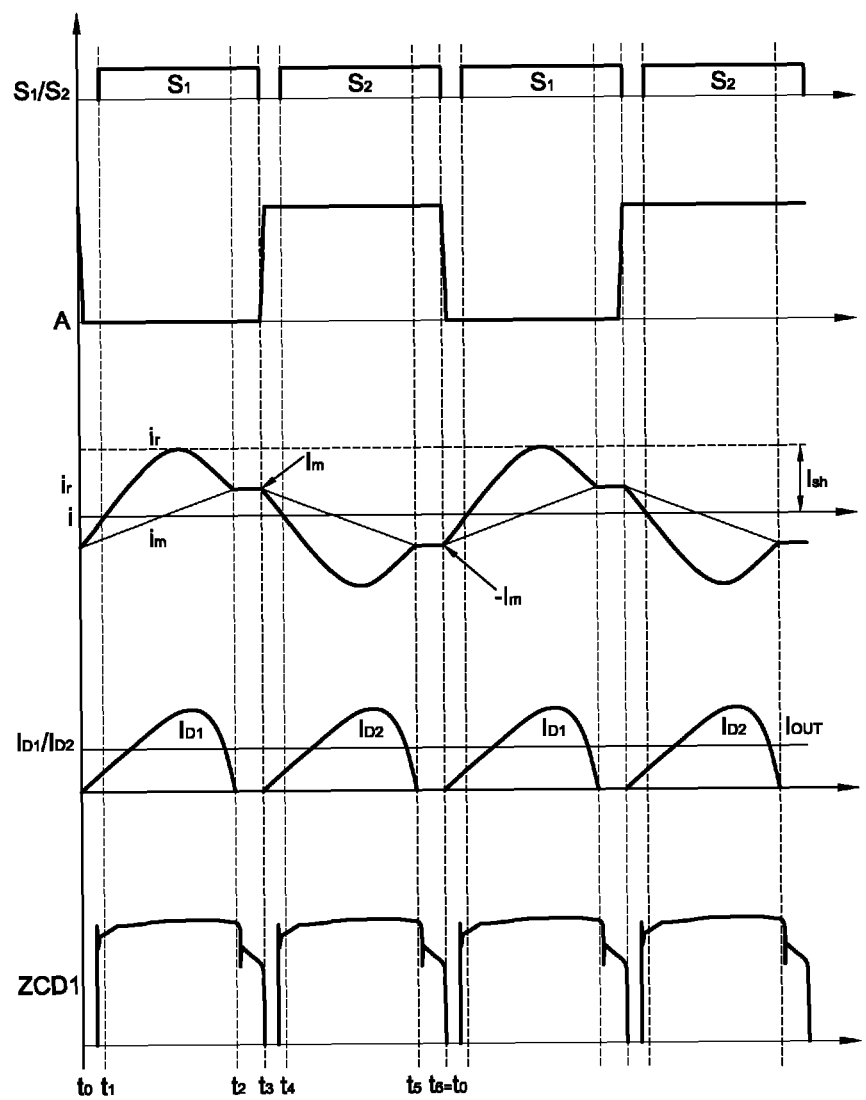
FIG. 3 is a graph depicting waveforms of operations under continuous conduction mode in accordance with the present invention.
Figure 4:
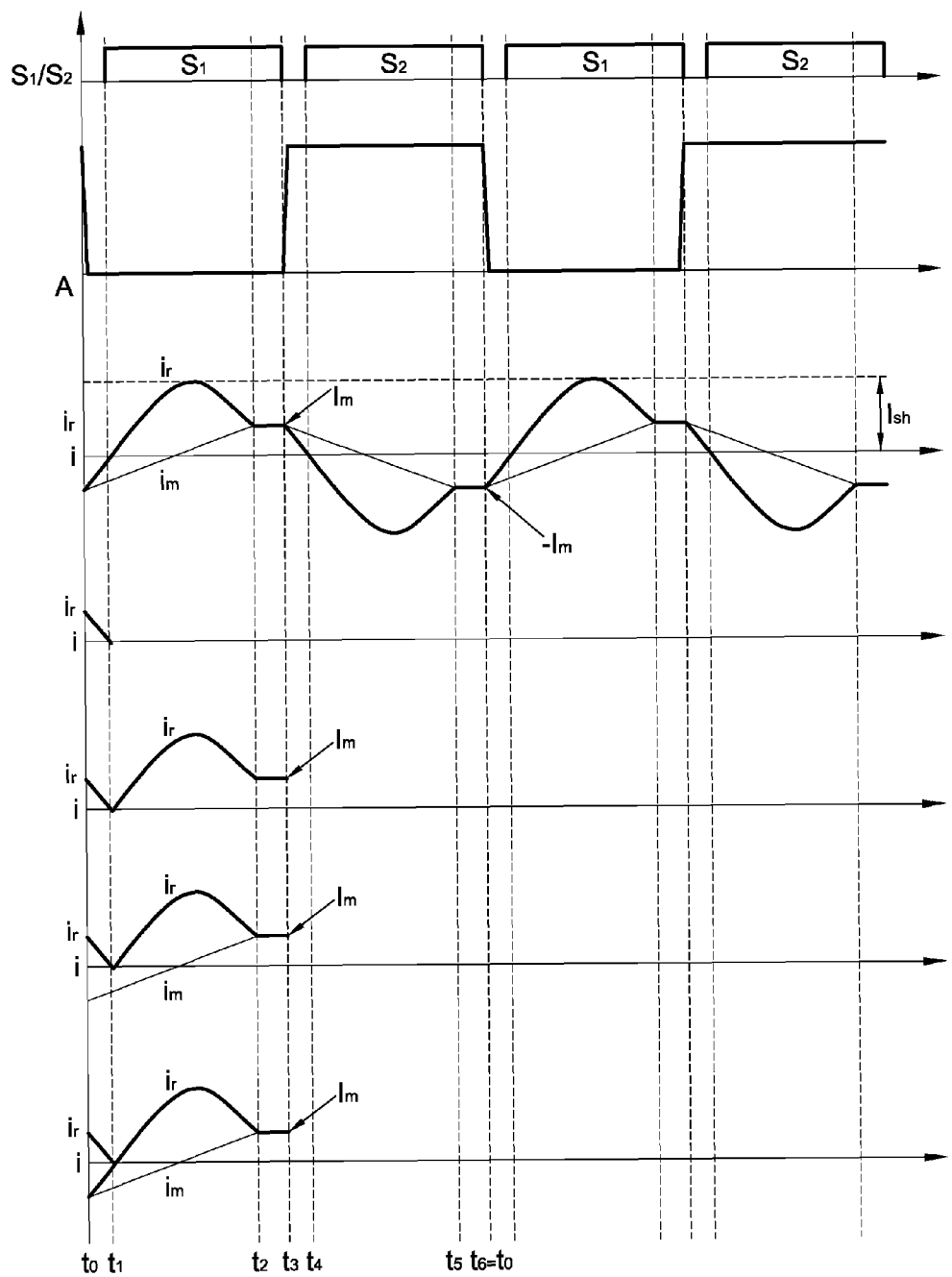
FIG. 4 is a graph depicting break down of one of the waveforms of FIG. 3.

Referring to FIGS. 1 and 2, the structure of the present invention primary includes:

a voltage polarity converting circuit 2 electrically connected with the primary side of a default LLC transformer 1 for converting negative voltage in a voltage signal to a positive voltage and outputting a positive-voltage signal;

a current signal sampling circuit 3 electrically connected with the voltage polarity converting circuit 2 for receiving the positive-voltage signal to obtain a current input signal;

a current cross-over detecting circuit 4 electrically connected with the voltage polarity converting circuit 2 for receiving the positive-voltage signal to calculate a zero-crossing current point;

a zero current detecting circuit 5 electrically connected with the primary side of the LLC transformer 1 to detect a zero current condition, in other words, the display device 5 being electrically connected to a zero potential node ZCD of the LLC transformer 1; and a current integrator circuit 6 electrically connected with the current signal sampling circuit 3, the current cross-over detecting circuit 4 and the zero current detecting circuit 5 for receiving the current input signal, the zero-crossing current point and the zero current condition to raise the minimum current level of the current input signal to the zero-crossing current point based on the zero-crossing current point and the zero current condition and generate and integrate a current integration waveform to create an output current to be transmitted to a predetermined LED driver circuit 7.

Accordingly, the voltage polarity converting circuit 2 obtains the voltage signal from the primary side of the LLC transformer 1 and outputs the positive-voltage signal. Then, the current integrator circuit 6 obtains the current input signal outputted by the current signal sampling circuit 3, the zero-crossing current point outputted by the current cross-over detecting circuit 4, and the zero current condition outputted by the zero current detecting circuit 5, and raises the minimum current level of the current input signal to the zero-crossing current point based on the zero-crossing current point and the zero current condition, and generate and integrate a current integration waveform to create an output current. In this way, the LLC transformer 1 can directly obtain, at the primary side, the output current for controlling the secondary-side output conditions, which in turn controls the LED driver circuit 7.

Referring to FIGS. 3 to 6, the control waveform of a control signal A is divided into positive cycles S1 and negative cycles S2 based on positive and negative half cycles. The sampling current $I_{SH}$ corresponds to the control signal A. $i_r$ is an actual current waveform displayed on an oscilloscope; $i_M$ is an excitation current produced during operations of the LLC transformer 1 and subsequently used for calculating an output current $I_{OUT}$; $I_M$ is a stabilized excitation current that is temporary held at a stable output condition during transition of the control signal A of the LLC transformer 1; and $I_{D1}$ and $I_{D2}$ are results obtained after the calculations. When the PSR current control system of present invention is in operation:

Time t0-t1: The sampling current $I_{SH}$ is negative, so the voltage polarity converting circuit 2 converts the negative voltage to a positive voltage.

Time t1-t2: Positive-voltage sampling current $I_{SH}$ is obtained.

Time t2-t4: The zero current detecting circuit (ZCD) 5 detects a zero-current output, so the sampling current $I_{SH}$ is held at the current at the time the zero current appeared.

Time t3-t4: The current cross-over detecting circuit 4 senses period change of the control signal A, i.e. from a low potential to a high potential. Meanwhile, the output current $I_{OUT}$ has a positive voltage.

Time t4-t5: Output current shifts from the positive cycle S1 to the negative cycle S2. The voltage polarity converting circuit 2 converts the negative current of the sampling current to a positive voltage.

Time t640: The current integrator circuit 6 integrates the current integration waveform from t0 to t6 and generates an output current $I_{OUT}$, in other words, the current integrator circuit 6 integrates the resonant current hi of the positive half cycle S1 and the resonant current $I_{D2}$ of the negative half cycle S2, so the LLC transformer 1 can directly obtain, at the primary side, the output current for controlling the secondary-side output conditions. A complete cycle of the control signal A is finished, operations similar to those described in the above time periods (t0-t6) are repeated in the subsequent cycles.

Figure 5:
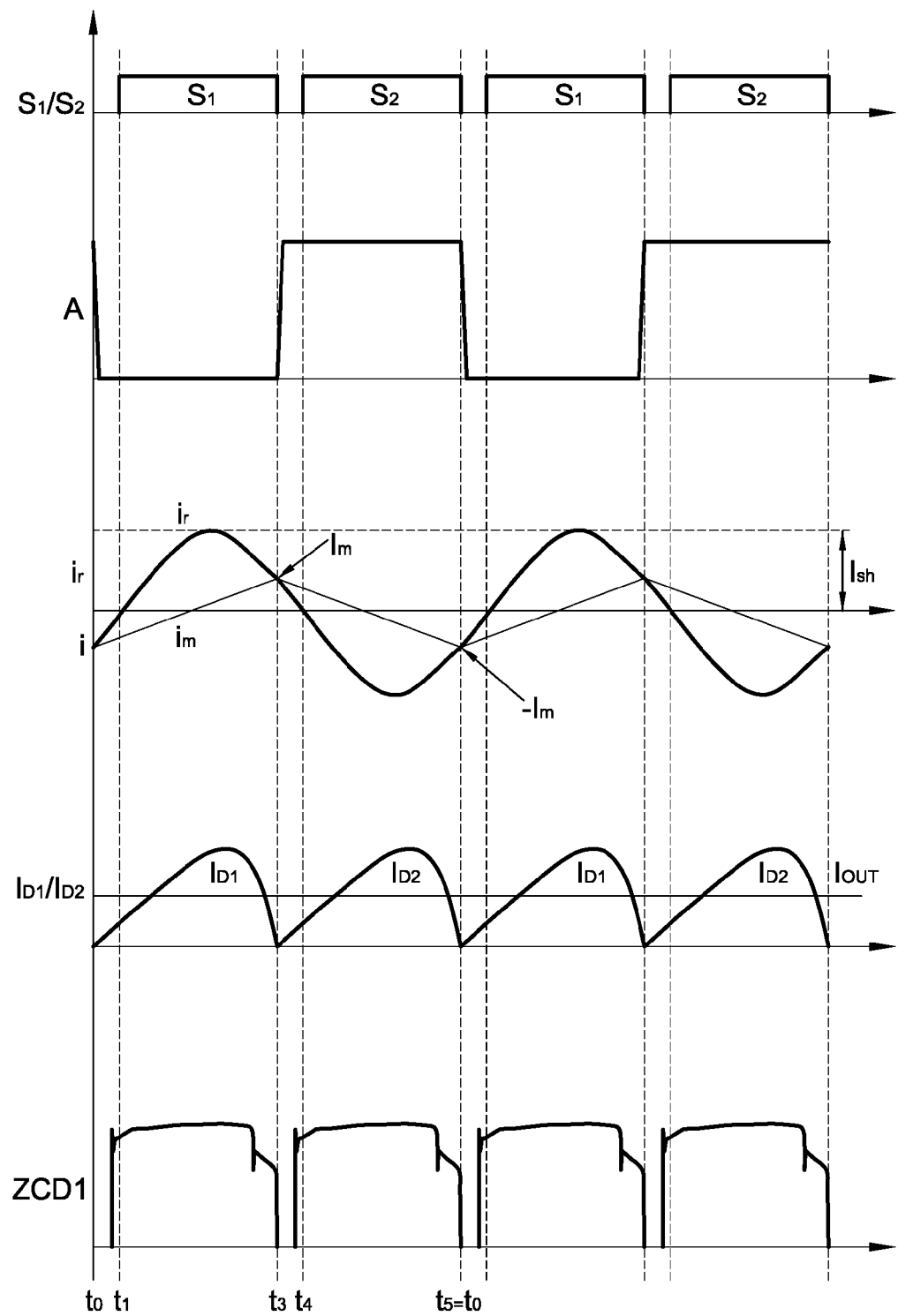
FIG. 5 is a graph depicting waveforms of operations under discontinuous conduction mode in accordance with the present invention.
Figure 6:
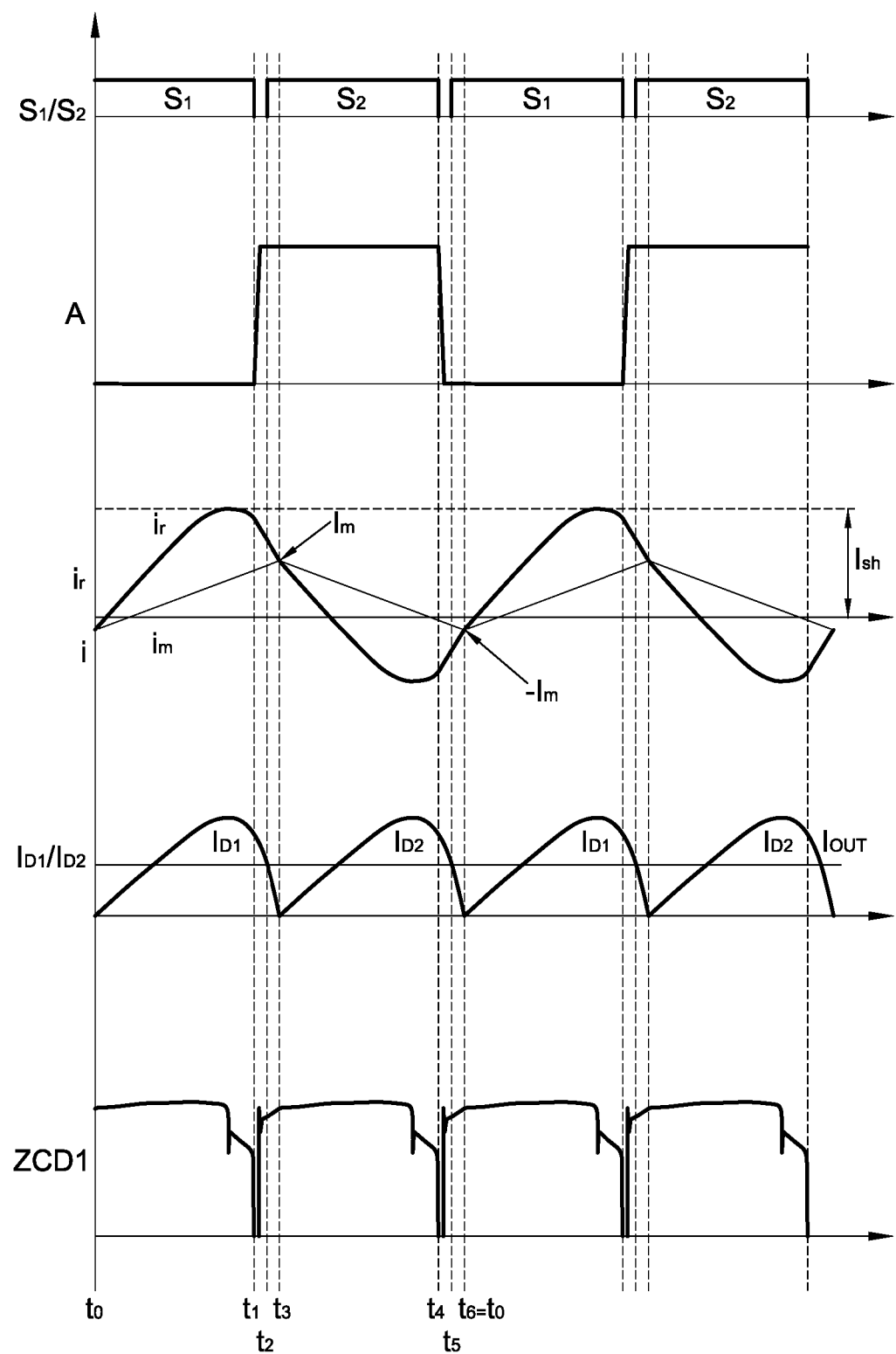
FIG. 6 is a graph depicting waveforms of operations under boundary conduction mode in accordance with the present invention.

The above descriptions on operations can be similarly applied to FIGS. 5 and 6, in which the analysis of the waveforms is the same, the difference being in the mode of operation.

In view of this, the PSR current control system under a LLC topology of the present invention is submitted to be novel and non-obvious and a patent application is hereby filed in accordance with the patent law. It should be noted that the descriptions given above are merely descriptions of preferred embodiments of the present invention, various changes, modifications, variations or equivalents can be made to the invention without departing from the scope or spirit of the invention. It is intended that all such changes, modifications and variations fall within the scope of the following appended claims and their equivalents.

What is claimed is:

1. A primary-side regulated (PSR) current control system under a LLC topology comprising:

a voltage polarity converting circuit electrically connected with the primary side of a default LLC transformer for converting negative voltage in a voltage signal to a positive voltage and outputting a positive-voltage signal;

a current signal sampling circuit electrically connected with the voltage polarity converting circuit for receiving the positive-voltage signal to obtain a current input signal;

a current cross-over detecting circuit electrically connected with the voltage polarity converting circuit for receiving the positive-voltage signal to calculate a zero-crossing current point;

a zero current detecting circuit electrically connected with the primary side of the LLC transformer to detect a zero current condition; and a current integrator circuit electrically connected with the current signal sampling circuit, the current cross-over detecting circuit and the zero current detecting circuit for receiving the current input signal, the zero-crossing current point and the zero current condition to raise the minimum current level of the current input signal to the zero-crossing current point based on the zero-crossing current point and the zero current condition, and generate and integrate a current integration waveform to create an output current, so the LLC transformer directly obtains, at the primary side, the output current for controlling secondary-side output conditions.

2. The PSR current control system under a LLC topology of claim 1, wherein the current cross-over detecting circuit is electrically connected to a default zero potential node of the LLC transformer.

3. The PSR current control system under a LLC topology of claim 1, wherein the current integrator circuit is electrically connected to a default LED driver circuit.

* * * * *